United States Patent
Joseph et al.

(10) Patent No.: US 12,513,604 B2
(45) Date of Patent: Dec. 30, 2025

(54) ENHANCEMENT TO SYSTEM INFORMATION BLOCK (SIB) VALIDITY CHECK FOR NON-PUBLIC NETWORKS (NPNs)

(71) Applicant: QUALCOMM Incorporated, San Diego, CA (US)

(72) Inventors: Vinay Joseph, Calicut (IN); Masato Kitazoe, Tokyo (JP); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 17/805,930

(22) Filed: Jun. 8, 2022

(65) Prior Publication Data
US 2022/0303882 A1 Sep. 22, 2022

Related U.S. Application Data

(63) Continuation of application No. 17/087,714, filed on Nov. 3, 2020, now Pat. No. 11,405,859.
(Continued)

(51) Int. Cl.
*H04W 48/16* (2009.01)
*H04W 12/10* (2021.01)
(Continued)

(52) U.S. Cl.
CPC .......... *H04W 48/16* (2013.01); *H04W 12/10* (2013.01); *H04W 48/08* (2013.01); *H04W 84/042* (2013.01)

(58) Field of Classification Search
CPC ..... H04W 48/16; H04W 12/10; H04W 48/08; H04W 84/042; H04W 84/105; H04W 48/12
See application file for complete search history.

(56) References Cited

U.S. PATENT DOCUMENTS

| 10,225,747 B2 | 3/2019 | Dhanapal et al. |
| 2020/0092800 A1* | 3/2020 | Chen ............. H04W 72/02 |

(Continued)

FOREIGN PATENT DOCUMENTS

| WO | 2016141067 A1 | 9/2016 |
| WO | 2017100355 A1 | 6/2017 |

(Continued)

OTHER PUBLICATIONS

Huawei, Consideration on SI Validity Checking, Nov. 18-22, 2019, 3GPP TSG-RAN WG2 Meeting # 108, R2-1915959, Reno, USA. (Year: 2019).*

(Continued)

*Primary Examiner* — Said M Elnoubi
(74) *Attorney, Agent, or Firm* — Dinsmore & Shohl LLP

(57) ABSTRACT

This disclosure provides systems, methods, and apparatus, including computer programs encoded on computer storage media, for operating a user equipment (UE) in a next generation (NG) radio access network (RAN) (NG-RAN) to validate a system information block (SIB) for non-public networks (NPNs). In one aspect, a UE receiving a SIB-one (SIB1) from a cell of the NG-RAN may determine whether the cell supports non-public networks (NPNs) based on the received SIB1. If so case, the UE may determine whether an NPN-identifier (NPN-ID) in the received SIB1 matches an NPN-ID of a SIB stored in memory. If so, the UE may validate the stored SIB based at least in part on the received SIB1. If not, the UE may invalidate the stored SIB and obtain a new SIB per standard procedures.

21 Claims, 9 Drawing Sheets

Related U.S. Application Data

(60) Provisional application No. 62/936,912, filed on Nov. 18, 2019.

(51) Int. Cl.
 *H04W 48/08* (2009.01)
 *H04W 84/04* (2009.01)

(56) References Cited

U.S. PATENT DOCUMENTS

| | | |
|---|---|---|
| 2021/0099924 A1 | 4/2021 | Shih et al. |
| 2021/0153108 A1 | 5/2021 | Joseph et al. |
| 2021/0360517 A1 | 11/2021 | Yang et al. |
| 2022/0159561 A1* | 5/2022 | Takahashi ............. H04W 48/18 |

FOREIGN PATENT DOCUMENTS

| | | | |
|---|---|---|---|
| WO | 2021073314 | A1 | 4/2021 |
| WO | 2021087921 | A1 | 5/2021 |
| WO | 2021140127 | A1 | 7/2021 |

OTHER PUBLICATIONS

Huawei, Consideration on SI Validity Checking, Nov. 2019, 3GPP TSG-RAN WG2 Meeting # 108, R2-1915959, Reno, USA, 18-22 (Year: 2019).*

Huawei, Consideration on SI Validity Checking, 3GPP TSG-RAN WG2 Meeting # 108, R2-1915959, Reno, USA, Nov. 18-22, 2019) (Year: 2019).*

Ericsson: "SIB1 Design for NPN", 3GPP TSG-RAN WG2 #108, Tdoc R2-1914628, Reno, USA, Nov. 18-22, 2019, pp. 1-12, sections 2.1.2-2.1.4, pp. 2-5 section 2 .1. 4, pp. 4-5 section 2.2.2.

International Search Report and Written Opinion—PCT/US2020/058766—ISA/EPO—Feb. 12, 2021 11 pages.

Huawei., et al., "Considerations on SI Validity Checking", 3GPP Draft, R2-1915959, 3rd Generation Partnership Project (3GPP), Mobile Competence Centre, 650, Route Des Lucioles, F-06921 Sophia-Antipolis Cedex, France, vol. RAN WG2. No. Reno, USA, Nov. 18, 2019-Nov. 22, 2019, Nov. 8, 2019, XP051817517, Retrieved from the Internet: URL: https://ftp.3gpp.org/tsg_ran/WG2_RL2/TSGR2_108/Docs/R2-1915959.zip, R2-1915959 Considerations on SI validity checking.doc, 3 pages.

* cited by examiner

ENHANCEMENT TO SYSTEM INFORMATION BLOCK (SIB) VALIDITY CHECK FOR NON-PUBLIC NETWORKS (NPNs)

RELATED APPLICATIONS

This application is a continuation of U.S. patent application Ser. No. 17/087,714 entitled "ENHANCEMENT TO SYSTEM INFORMATION BLOCK (SIB) VALIDITY CHECK FOR NON-PUBLIC NETWORKS (NPNs)" filed Nov. 3, 2020, which claims the benefit of priority to U.S. Provisional Application No. 62/936,912 entitled "ENHANCEMENT TO SYSTEM INFORMATION BLOCK (SIB) VALIDITY CHECK FOR NON-PUBLIC NETWORKS (NPNs)" filed Nov. 18, 2019, the entire contents of both which are hereby incorporated by reference for all purposes.

TECHNICAL FIELD

This disclosure relates to operations using system information blocks (SIBs) in next generation (NG) radio access networks (RANs) (NG-RANs).

DESCRIPTION OF THE RELATED TECHNOLOGY

Long Term Evolution (LTE), Fifth Generation (5G)—new radio (NR), and other recently developed communication technologies allow wireless devices to communicate information at data rates (such as in terms of Gigabits per second, etc.) that are orders of magnitude greater than what was available just a few years ago.

Today's communication networks are also more secure, resilient to multipath fading, allow for lower network traffic latencies, provide better communication efficiencies (such as in terms of bits per second per unit of bandwidth used, etc.). These and other recent improvements have facilitated the emergence of the Internet of Things (IOT), large scale Machine to Machine (M2M) communication systems, vehicles, and other technologies that rely on consistent and secure communications.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless mobile communication device (hereinafter referred to as "user equipment" or "UE"). Some implementations may include methods performed by an apparatus of a UE for operating in a next generation (NG) radio access network (RAN) (NG-RAN). Various implementations may include receiving a system information block (SIB) one (SIB1) from a cell of the NG-RAN, determining whether the cell supports non-public networks (NPNs) based on the received SIB1, determining whether a NPN-identifier (NPN-ID) in the received SIB1 matches a NPN-ID in a stored SIB in response to determining that the cell supports NPNs based on the received SIB1, and validating the stored SIB based at least in part on the received SIB1 in response to determining that the NPN-ID in the received SIB1 and the NPN-ID associated with the stored SIB match.

In some implementations, determining whether the cell supports NPNs based on the received SIB1 may involve determining whether the cell supports only NPNs based on the received SIB1, and determining whether a NPN-identifier (NPN-ID) in the received SIB1 matches an NPN-ID associated with a stored SIB in response to determining that the cell supports NPNs based on the received SIB1 may involve determining whether an NPN-ID in the received SIB1 matches an NPN-ID associated with a stored SIB in response to determining that the cell supports only NPNs based on the received SIB1.

Some implementations may further include indicating that the stored SIB is invalid in response to determining that the NPN-ID in the received SIB1 and the NPN-ID associated with the stored SIB do not match. In some implementations, the NPN-ID may be a standalone NPN (SNPN)-identifier (SNPN-ID). In some implementations, the SNPN-ID may include a network identifier (NID) and optionally a public land mobile network (PLMN)-identifier (PLMN-ID). In some implementations, the NPN-ID is a combination of a PLMN-ID and a closed access group (CAG)-identifier (CAG-ID). In some implementations, only a first NPN-ID in the received SIB and only a first NPN-ID associated with the stored SIB are used to determine whether the NPN-ID in the received SIB1 matches the NPN-ID associated with the stored SIB.

Some implementations may further include determining whether an NPN-ID in the received SIB1 indicates that the cell is associated with a SNPN and a network identifier of the SNPN is locally managed. In some implementations, the NPN-ID in the received SIB1 that indicates that the cell is associated with the SNPN may be a first NPN in the received SIB1. Some implementations may further include preventing storage of the received SIB1 in response to determining that the NPN-ID in the received SIB1 indicates that the cell is associated with a standalone SNPN and a network identifier of the SNPN is locally managed. In some implementations, indicating any stored SIB is invalid in response to determining that the NPN-ID in the received SIB1 may indicate that the cell is associated with a standalone SNPN and a network identifier of the SNPN is locally managed. In some implementations, the network identifier of the SNPN being locally managed may be indicated at least in part by one or more bits of the network identifier of the SNPN.

In some implementations, the SIB1 may be received on a downlink-shared channel (DL-SCH). In some implementations, the cell may be a serving cell. In some implementations, the received SIB1 may indicate that the cell supports NPNs by one or more of an information element "cellreservedforotheruse" in the SIB1 set to true and at least one NPN-ID or CAG-ID indicated in the SIB1, an indication in the SIB1 indicates that the cell provides access to NPNs, and only one PLMN-ID is included in the information element "PLMN-IdentityInfoList" in the SIB1 and the PLMN-ID is a value associated with indicating NPN support.

Another innovative aspect of the subject matter described in this disclosure can be implemented in an apparatus of a UE. Some implementations may include a first interface configured to receive a SIB1 from a cell of the NG-RAN and a processing system coupled to the first interface and configured to determine whether the cell supports NPNs based on the received SIB1, determine whether a NPN-ID in the received SIB1 matches an NPN-ID in a stored SIB in response to determining that the cell supports NPNs based on the received SIB1, and validate the stored SIB based at least in part on the received SIB1 in response to determining that the NPN-ID in the received SIB1 and the NPN-ID associated with the stored SIB match.

In some implementations, the processing system may determine whether the cell supports NPNs based on the received SIB1 by determining whether the cell supports only NPNs based on the received SIB1, and determine whether a NPN-identifier (NPN-ID) in the received SIB1 matches an NPN-ID associated with a stored SIB in response to determining that the cell supports only NPNs based on the received SIB1.

In some implementations, the processing system may be further configured to indicate that the stored SIB is invalid in response to determining that the NPN-ID in the received SIB1 and the NPN-ID associated with the stored SIB do not match. In some implementations, the processing system may be configured such that the NPN-ID may be a SNPN-ID. In some implementations, the processing system may be configured such that the SNPN-ID may include a network identifier (NID) and optionally a PLMN-ID. In some implementations, the processing system may be configured such that the NPN-ID is a combination of a PLMN-ID and a CAG-ID. In some implementations, the processing system may be configured such that only a first NPN-ID in the received SIB1 and only a first NPN-ID associated with the stored SIB are used to determine whether the NPN-ID in the received SIB1 matches the NPN-ID associated with the stored SIB.

In some implementations, the processing system may be further configured to determine whether an NPN-ID in the received SIB1 indicates that the cell is associated with a standalone NPN (SNPN) and a network identifier of the SNPN is locally managed. In some implementations, the processing system may be configured such that the NPN-ID in the received SIB1 that indicates that the cell is associated with the SNPN may be a first NPN in the received SIB1. In some implementations, the processing system may be further configured to prevent storage of the received SIB1 in response to determining that the NPN-ID in the received SIB1 indicates that the cell is associated with a standalone SNPN and a network identifier of the SNPN is locally managed. In some implementations, the processing system may be configured such that indicating any stored SIB is invalid in response to determining that the NPN-ID in the received SIB1 may indicate that the cell is associated with a standalone SNPN and a network identifier of the SNPN is locally managed. In some implementations, the processing system may be configured such that the network identifier of the SNPN being locally managed may be indicated at least in part by one or more bits of the network identifier of the SNPN.

In some implementations, the first interface may be configured such that the SIB1 may be received on a DL-SCH. In some implementations, the cell may be a serving cell. In some implementations, the received SIB1 may indicate that the cell supports NPNs by one or more of an information element "cellreservedforotheruse" in the SIB1 set to true and at least one NPN-ID or CAG-ID indicated in the SIB1, an indication in the SIB1 indicates that the cell only provides access to NPNs, and only one PLMN-ID is included in the information element "PLMN-IdentityInfoList" in the SIB1 and the PLMN-ID is a value associated with indicating NPN support.

Another innovative aspect of the subject matter described in this disclosure can be implemented in a non-transitory processor-readable medium having stored thereon processor-executable instructions configured to cause a UE to perform various operations, some implementations of which may include receiving a SIB1 from a cell of the NG-RAN, determining whether the cell supports NPNs based on the received SIB1, determining whether an NPN-ID in the received SIB1 matches a NPN-ID in a stored SIB in response to determining that the cell supports NPNs based on the received SIB1, and validating the stored SIB based at least in part on the received SIB1 in response to determining that the NPN-ID in the received SIB1 and the NPN-ID associated with the stored SIB match.

Another innovative aspect of the subject matter described in this disclosure can be implemented in a UE that includes means for receiving a SIB1 from a cell of the NG-RAN, means for determining whether the cell supports NPNs based on the received SIB1, means for determining whether an NPN-ID in the received SIB1 matches a NPN-ID in a stored SIB in response to determining that the cell supports NPNs based on the received SIB1, and means for validating the stored SIB based at least in part on the received SIB1 in response to determining that the NPN-ID in the received SIB1 and the NPN-ID associated with the stored SIB match.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
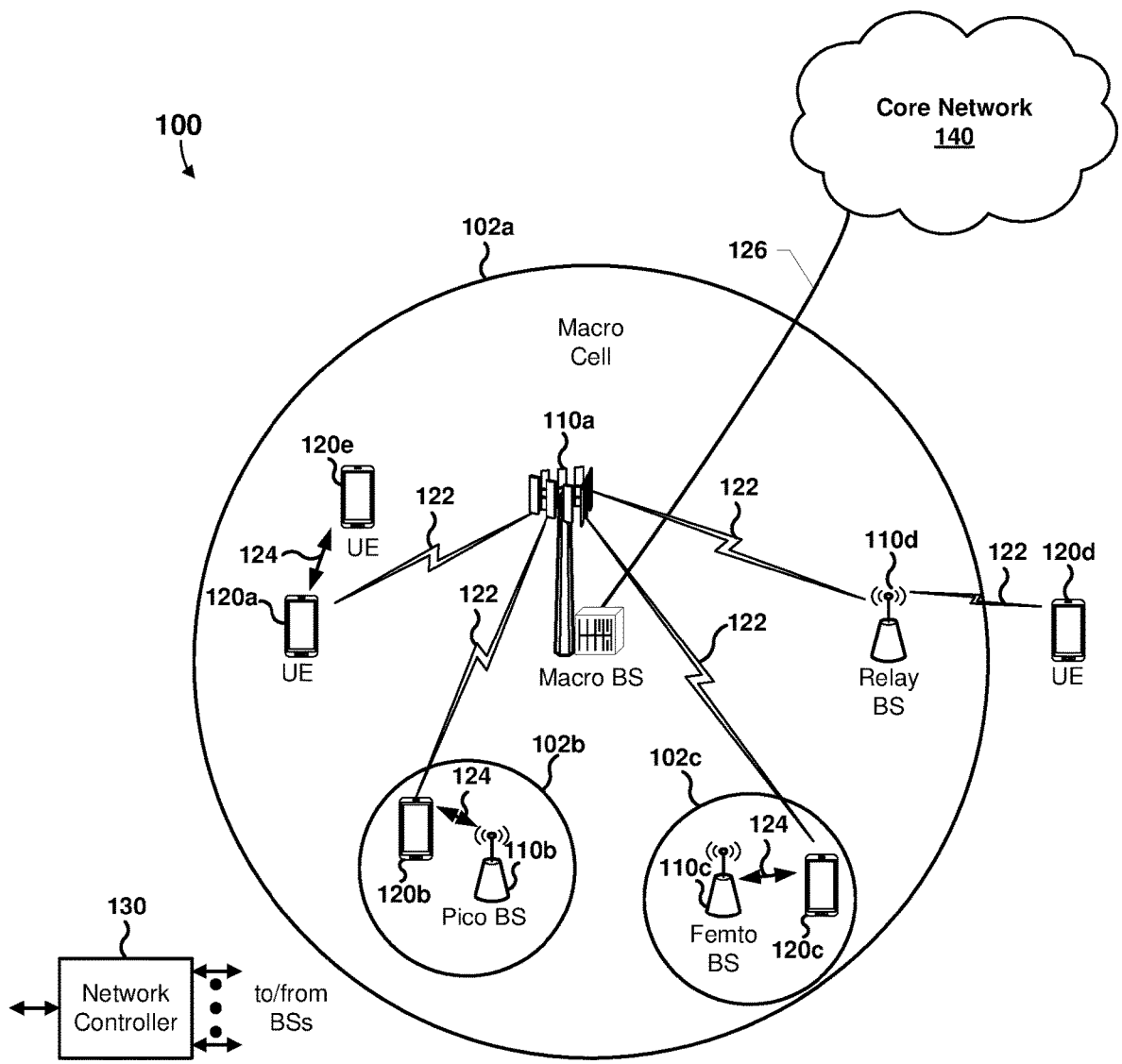
FIG. 1 shows a system block diagram illustrating an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Various implementations described in this disclosure include methods performed by an apparatus (such as a processing system) of a UE for implementing operations in a next generation (NG) radio access network (RAN) (NG-RAN).

Some implementations may provide an enhancement to a validity check of a system information block (SIB, such as a SIB1, SIB3, SIB4, etc.). In some implementations, if a cell provides access to NPNs, an NPN-ID (such as a SNPN-ID or PLMN-ID+CAG-ID) broadcast in a SIB1 may be used for a SIB validity check. In some implementations, the first NPN-ID broadcast in the SIB1 may be used for SIB validity checks. In some implementations, an NPN-ID other than the first NPN-ID broadcast in the SIB1 may be used for SIB validity checks. In some implementations, if the cell doesn't provide access to only NPNs, the first PLMN-ID in the PLMN-IdentityInfoList element of the SIB1 may be used for a SIB validity check. As an example, a cell that only provides access to NPNs may be an NPN-only cell.

In some implementations, a cell may be determined to provide access only to NPNs based on one or more of the following: 1) the cell broadcasting a cellreservedforotheruse information element set to true and broadcasting at least one of a network identifier (NID) or CAG-ID; 2) the cell broadcasting an indication to indicate that the cell provides access only to NPNs; or 3) only one PLMN-ID being included in the PLMN-IdentityInfoList element and set to a specific Third Generation Partnership Project (3GPP) value.

In some implementations, a UE may not store a SIB from a cell if an NPN-ID in the SIB (such as the first NPN-ID or an NPN-ID other than the first NPN-ID) is associated with a SNPN and the associated broadcasted NID is a locally managed one.

In some implementations, a UE may consider a stored SIB to be invalid an NPN-ID in the SIB (such as the first NPN-ID or an NPN-ID other than the first NPN-ID) is associated with a SNPN and the associated broadcasted NID is a locally managed one.

Particular implementations of the subject matter described in this disclosure can be implemented to realize one or more of the following potential advantages. Some implementations may improve operations of a UE to validate stored SIBs, specifically stored SIBs associated with NPNs. Validating stored SIBs may enable faster system information (SI) acquisition after events triggering SI acquisition (such as after cell re-selection, upon return from out of coverage, after reception of an SI change indication, etc.) because valid SIBs may be reused, rather than requiring the UE to download the already stored valid SIBs. Some implementations may improve the operations of a UE in a SNPN that is associated with a locally managed NID by preventing misuse of a wrong SIB due to collision or confusion between NIDs and thereby preventing unwanted emissions that may violate emission settings or regulations.

The terms "wireless device" or "computing device" are used interchangeably herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example smart rings, smart bracelets, etc.), entertainment devices (for example wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within vehicles, wireless devices affixed to or incorporated into various mobile platforms, global positioning system devices, and similar electronic devices that include a memory, wireless communication components and a programmable apparatus (such as a processing system).

The term "system on chip" (SOC) is used herein to refer to a single integrated circuit (IC) chip that contains an apparatus (such as a processing system) of multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (for example ROM, RAM, Flash, etc.), and resources (for example timers, voltage regulators, oscillators, etc.). SOCs also may include software for controlling the integrated resources and processors, as well as for controlling peripheral devices.

The term "system in a package" (SIP) may be used herein to refer to a single module or package that contains an apparatus (such as a processing system) of multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (for example CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The term "processing system" is used herein to refer to a processor, a SOC, or a SIP, coupled to or including a memory device.

FIG. 1 shows a system block diagram illustrating an example communications system 100. The communications system 100 may be a 5G NR network (such as a next generation (NG) radio access network (RAN) (NG-RAN)), or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e (or UE computing device) may communicate with the base station 110a-110d over a wireless communication link 122.

The wired communication link 126 may use a variety of wired networks (for example Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (for example relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (for example NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Certain wireless networks in the communications system 100 may be non-public networks (NPNs) for non-public use. NPNs may include different types of networks. Some NPNs may be stand-alone non-public networks (SNPNs) that may be operated by an NPN operator and not rely on network functions provided by a public land mobile network (PLMN). Some NPNs may be public network integrated NPNs (PNI-NPNs) that may be non-public networks deployed with the support of PLMNs. PNI-NPNs may be deployed in different manners. One deployment for PNI-NPNs may include using slicing by allocating a network slice to an NPN. Another deployment for PNI-NPNs may include using closed access groups (CAGs).

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 milliseconds (ms) duration. Each radio frame may consist of 50 subframes with a length of 10 msec. Consequently, each subframe may have a length of 0.2 msec. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more mobile devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V21) protocol, or similar protocol), a mesh network, or similar networks, or combinations thereof. In this case, the wireless device 120a-120e may perform scheduling operations, resource selection operations, as well as other operations described elsewhere herein as being performed by the base station 110a.

Figure 2:
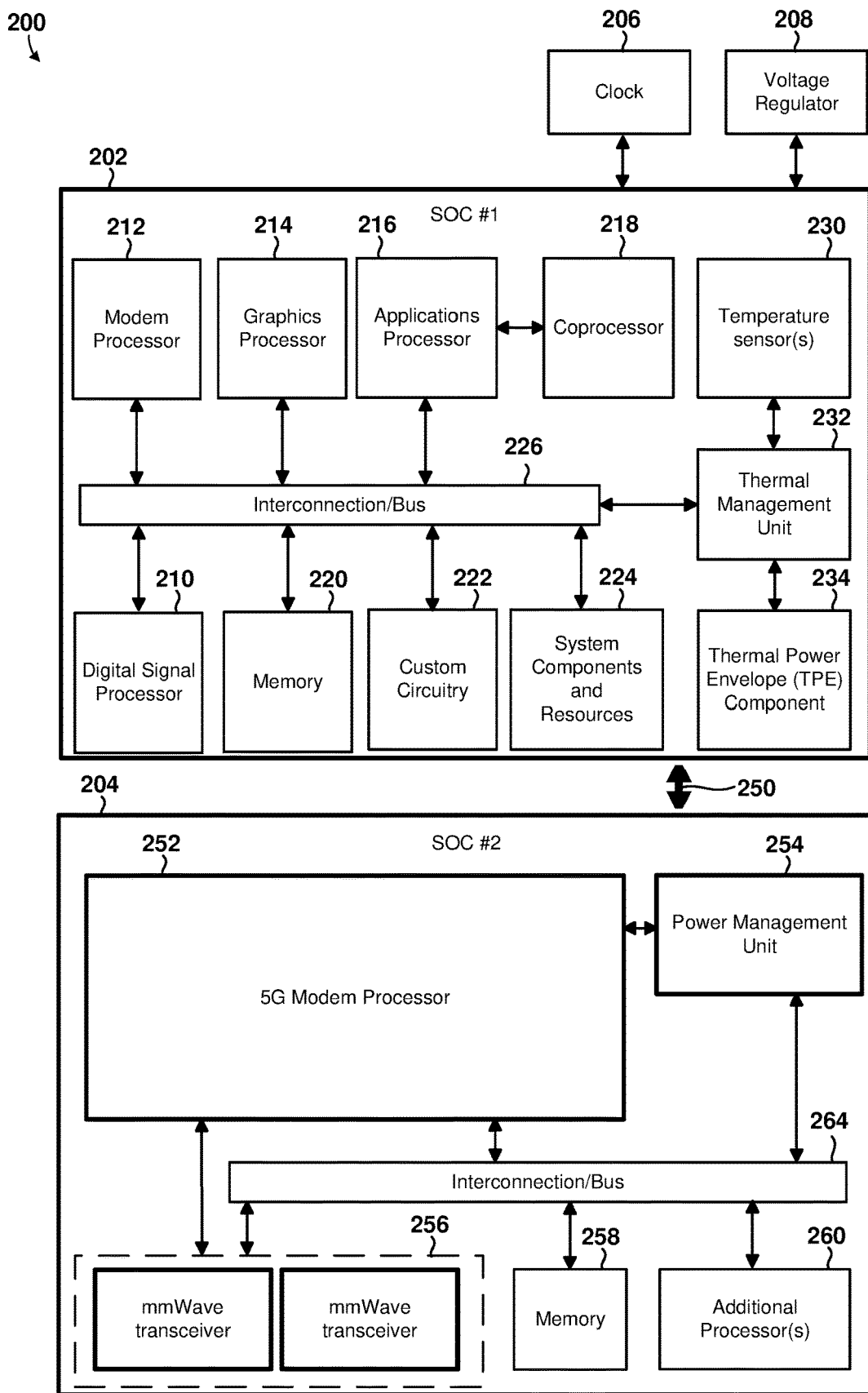
FIG. 2 shows a component block diagram illustrating an example computing system that may be configured to implement operations in a next generation (NG) radio access network (RAN) (NG-RAN).

FIG. 2 shows a component block diagram illustrating an example computing system that may be configured to implement operations in an NG-RAN. Some implementations may be implemented on a number of single processor and multiprocessor computer systems, including a system-on-chip (SOC) or system in a package (SIP). FIG. 2 shows an example computing system or SIP 200 architecture that may be used in wireless devices (UE computing devices) implementing the various implementations.

With reference to FIGS. 1 and 2, the illustrated example SIP 200 includes a two SOCs 202, 204, a clock 206, and a voltage regulator 208. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (for example 5 Gbps, etc.), or very high frequency short wavelength (for example 28 GHz mmWave spectrum, etc.) communications.

The first SOC 202 may include a digital signal processor (DSP) 210, a modem processor 212, a graphics processor 214, an application processor 216, one or more coprocessors 218 (for example vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 in an apparatus (such as a processing system) may include one or more cores, and each processor/core may perform operations independent of the other processors/cores. For example, the first SOC 202 may include a processor that executes a first type of operating system (for example FreeBSD, LINUX, OS X, etc.) and a processor that executes a second type of operating system (for example MICROSOFT WINDOWS 10). In addition, any or all of the processors 210, 212, 214, 216, 218, 252, 260 may be included as part of a processor cluster architecture (for example a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (for example CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (for example clock 206, voltage regulator 208) may be shared by two or more of the internal SOC processors/cores.

In addition to the example SIP 200 discussed above, some implementations may be implemented in a wide variety of processing systems, which may include a single processor, multiple processors, multicore processors, or any combination thereof.

Figure 3:
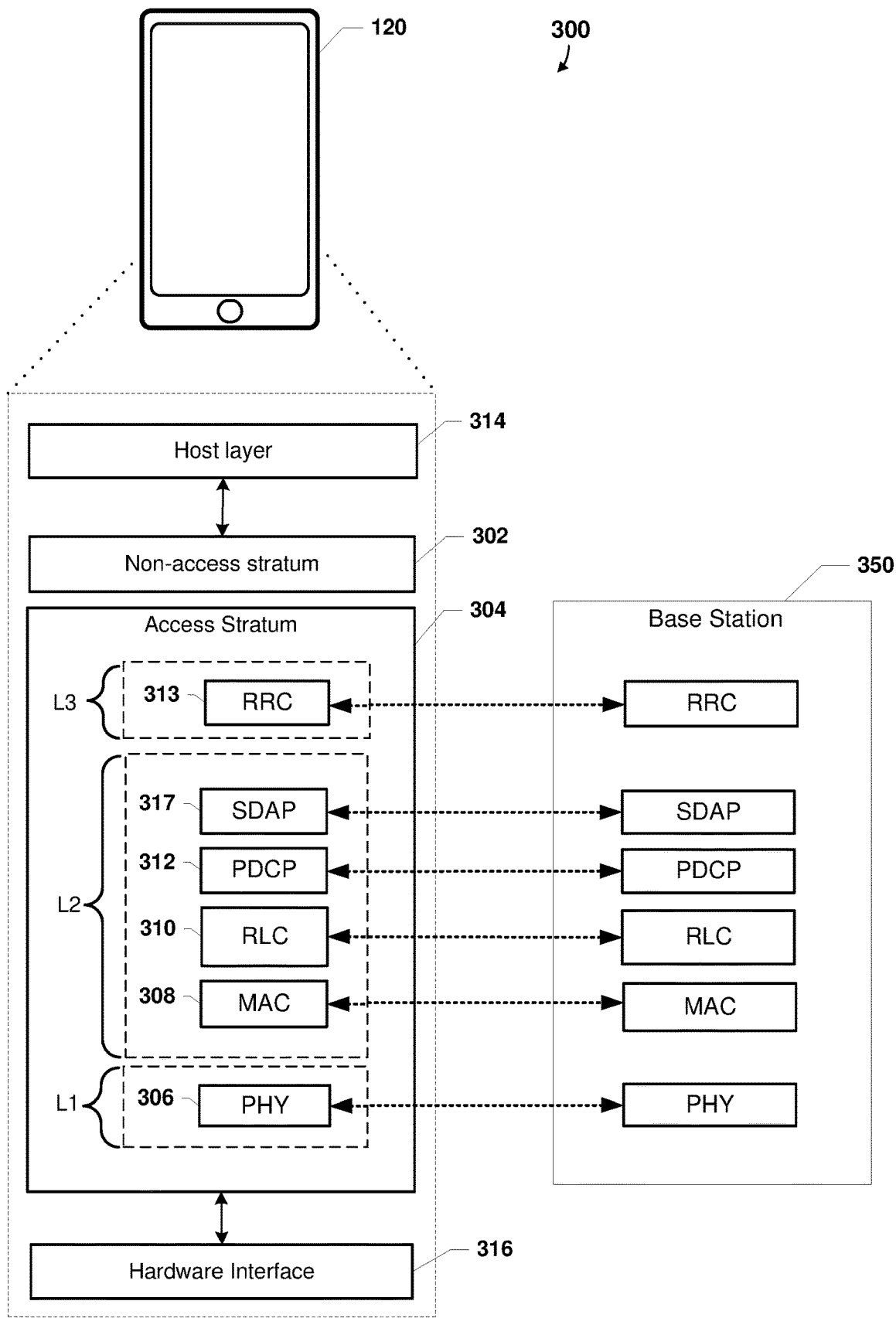
FIG. 3 shows a component block diagram of an example software architecture including a radio protocol stack for the user and control planes in wireless communications.

FIG. 3 shows a component block diagram of an example software architecture including a radio protocol stack for the user and control planes in wireless communications. FIG. 3 shows an example of a software architecture 300 including a radio protocol stack for the user and control planes in wireless communications between a base station 350 (for example the base station 110a) and a wireless device 120 (for example the wireless device (UE computing device) 120a-120e, 200). With reference to FIGS. 1-3, the wireless device 120 may implement the software architecture 300 to communicate with the base station 350 of a communication system (for example 100). In some implementations, layers in software architecture 300 may form logical connections with corresponding layers in software of the base station 350. The software architecture 300 may be distributed among one or more processing systems (for example the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (for example two protocol stacks associated with two SIMs, respectively, in a dual-SIM wireless communication device). While described below with reference to specific 5G-NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (for example SIM(s) 204) and its core network 140. The AS 304 may include functions and protocols that support communication between a SIM(s) (for example SIM(s) 204) and entities of supported access networks (for example a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions INCLUDING broadcasting system information, paging, and establishing and releasing an RRC signaling connection between the wireless device 120 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some implementations, application-specific functions provided by the at least one host layer 314 may provide an interface between the software architecture and the general purpose processor 206.

In some other implementations, the software architecture 300 may include one or more higher logical layer (for example transport, session, presentation, application, etc.) that provide host layer functions. For example, in some implementations, the software architecture 300 may include a network layer (for example IP layer) in which a logical connection terminates at an access and mobility factor (AMF) or packet data network (PDN) gateway (PGW). In some implementations, the software architecture 300 may include an application layer in which a logical connection terminates at another device (for example end user device, server, etc.). In some implementations, the software architecture 300 may further include in the AS 304 a hardware interface 316 between the physical layer 306 and the communication hardware (for example one or more radio frequency (RF) transceivers).

Figure 4:
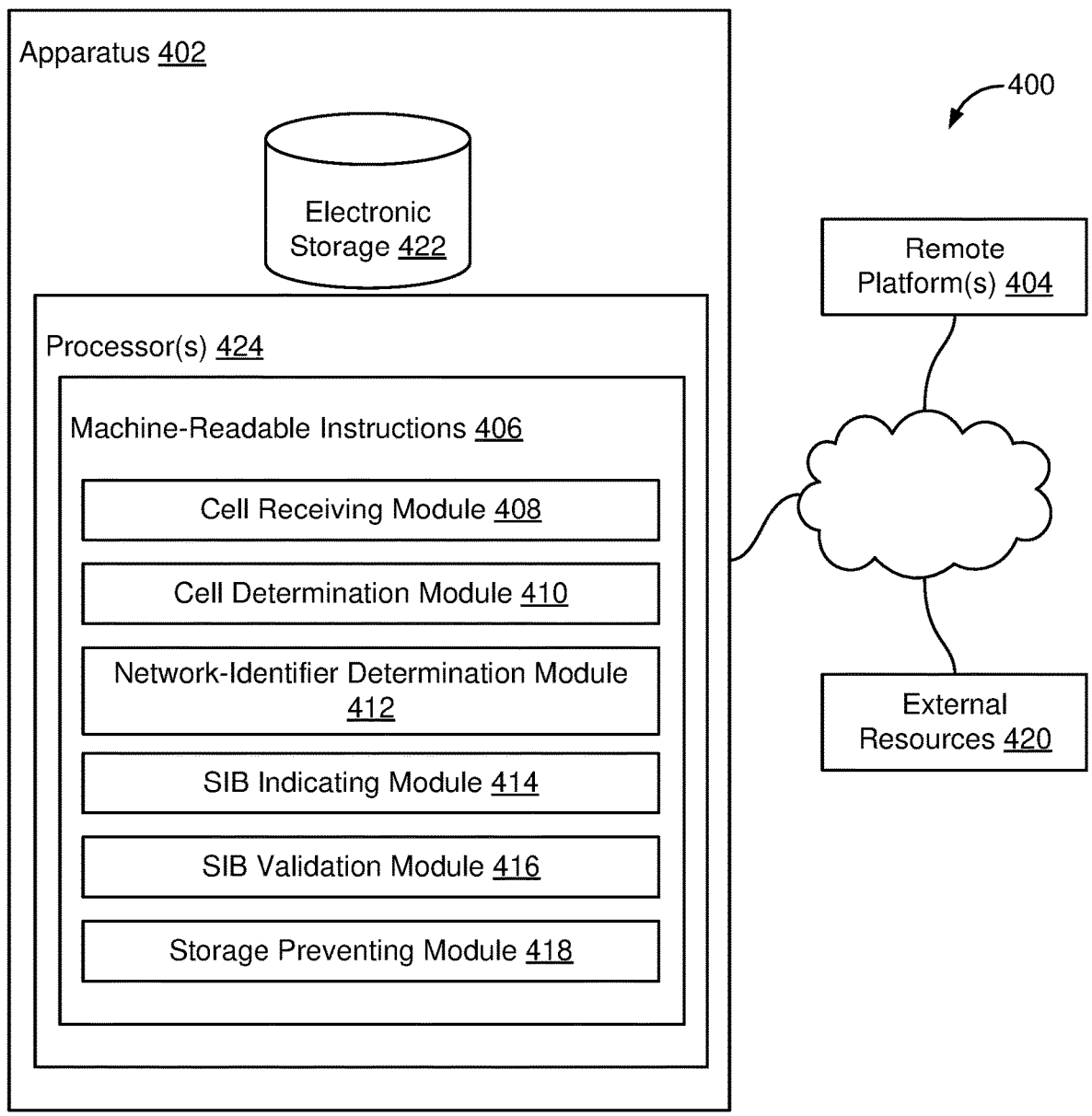
FIG. 4 shows a component block diagram illustrating an example system configured for operations in an NG-RAN.

FIG. 4 shows a component block diagram illustrating an example system configured for operations in an NG-RAN. In some implementations, the system 400 that may be implemented in a UE may an apparatus 402. With reference to FIGS. 1-4, the apparatus 402 may be implemented in a UE (for example the wireless devices 120, 120*a*-120*e*, 200). The remote platform(s) 404 may include a base station (for example the base station 110*a*-110*d*, 350) or a wireless device (for example the wireless device 120, 120*a*-120*e*, 200).

The apparatus 402 may be configured by machine-readable instructions 406. Machine-readable instructions 406 may include one or more instruction modules. The instruction modules may include computer program modules. The instruction modules may include one or more of cell receiving module 408, cell determination module 410, network-identifier determination module 412, SIB indicating module 414, SIB validation module 416, storage preventing module 418, or other instruction modules.

Cell receiving module 408 may be configured to receive a SIB1 from a cell of the next generation radio access network. The cell may be a serving cell. In some implementations, the SIB1 may be received on a downlink-shared channel (DL-SCH).

Cell determination module 410 may be configured to determine whether the cell supports a non-public network (NPN) based on the received SIB1. In some aspects, the cell determination module 410 may be configured to determine whether the cell supports only a non-public network (NPN) based on the received SIB1.

Network-identifier determination module 412 may be configured to determine whether an NPN-identifier (NPN-ID) in the received SIB1 matches an NPN-identifier in a stored SIB in response to determining that the cell supports an NPN based on the received SIB1. In some aspects, the network-identifier determination module 412 may be configured to determine whether an NPN-identifier (NPN-ID) in the received SIB1 matches an NPN-identifier in a stored SIB in response to determining that the cell supports only an NPN based on the received SIB1.

Network-identifier determination module 412 may be configured to determine whether an NPN-ID in the received SIB1 indicates that the cell is associated with a standalone NPN (SNPN) and a network identifier of the SNPN is locally managed.

Network-identifier determination module 412 may be configured to determine whether an NPN-ID in the received SIB1 indicates that the cell is associated with a SNPN and a network identifier of the SNPN is locally managed. The NPN-ID may be a SNPN-ID. The SIB1 may be received on a DL-SCH. The NPN-ID may be a combination of a public land mobile network (PLMN)-identifier (PLMN-ID) and a closed access group (CAG)-identifier (CAG-ID). The SIB1 may be received on a DL-SCH.

SIB indicating module 414 may be configured to indicate that the stored SIB is invalid in response to determining that the NPN-ID in the received SIB1 and the NPN-ID associated with the stored SIB do not match.

SIB indicating module 414 may be configured to indicate any stored SIB is invalid in response to determining that the NPN-ID in the received SIB1 indicates that the cell is associated with a SNPN and a network identifier of the SNPN is locally managed.

SIB validation module 416 may be configured to validate the stored SIB based at least in part on the received SIB1 in response to determining that the NPN-ID in the received SIB1 and the NPN-ID associated with the stored SIB match.

Storage preventing module 418 may be configured to prevent storage of the received SIB1 in response to determining that the NPN-ID in the received SIB1 indicates that the cell is associated with a SNPN and a network identifier of the SNPN is locally managed.

Figure 5:
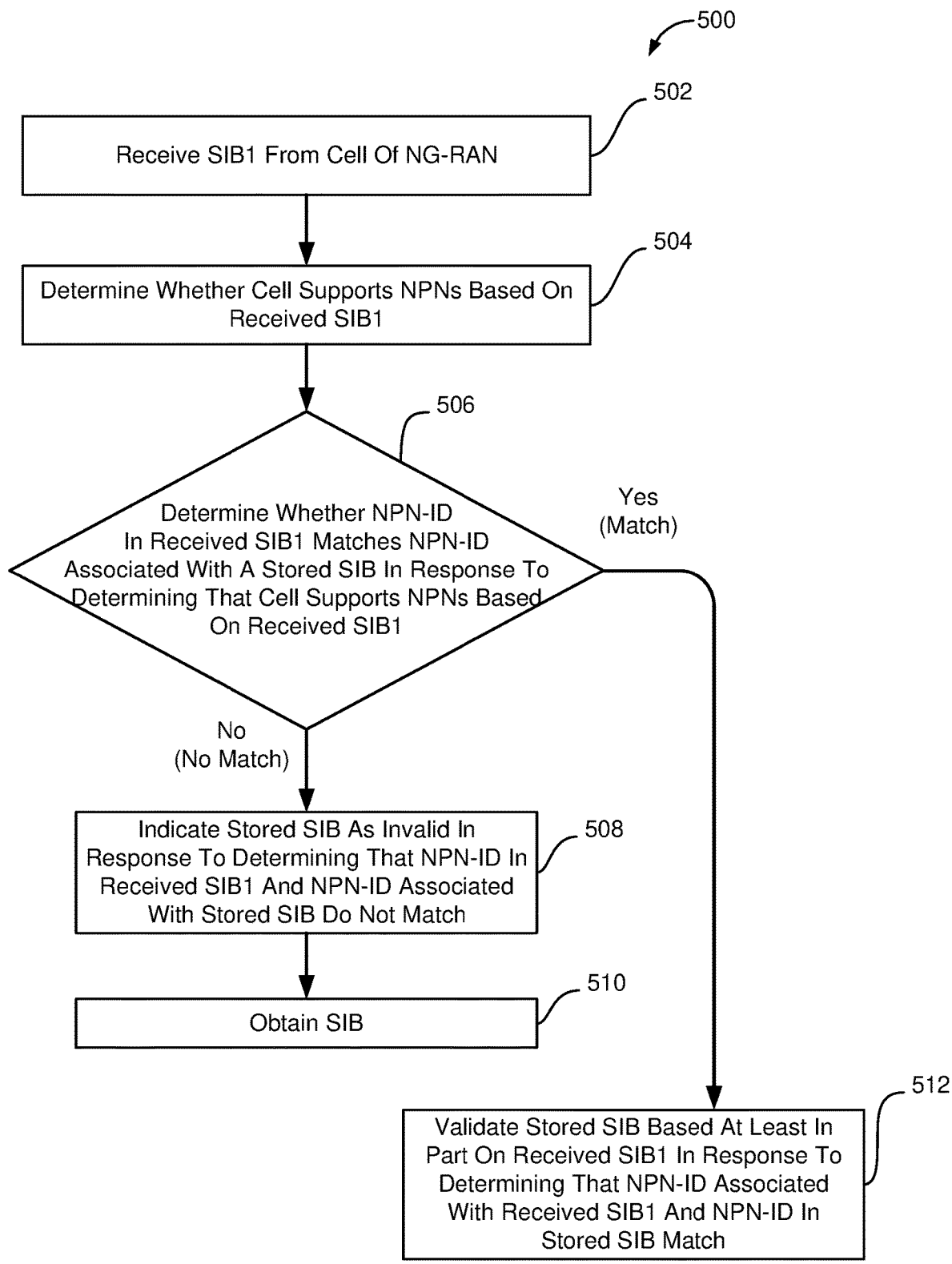
FIG. 5 shows a process flow diagram for an example method for implementing operations in an NG-RAN by an apparatus of a user equipment (UE).

FIG. 5 shows a process flow diagram for an example method for implementing operations in an NG-RAN by an apparatus (such as a processing system) of a UE. With reference to FIGS. 1-5, the method 500 may be implemented by an apparatus (such as a processing system) (such as 212, 216, 252 or 260) of a UE (such as the wireless device 120, 120a-120e, 200). The operations of method 500 may be performed in conjunction with the operations of method 600 or method 700.

In block 502, the apparatus (such as a processing system) may perform operations including receiving a SIB1 from a cell of the next generation radio access network. In some aspects, the SIB1 may be received on a downlink-shared channel (DL-SCH). In some aspects, the cell may be a serving cell.

In block 504, the apparatus (such as a processing system) may perform operations including determining whether the cell supports NPNs based on the received SIB1. In some aspects, the apparatus (such as a processing system) may determine whether the cell supports only NPNs based on the received SIB1. In some aspects, the received SIB1 may indicate that the cell supports NPNs or only NPNs by one or more of an information element "cellreservedforotheruse" in the SIB1 set to true and at least one NPN-ID or CAG-ID indicated in the SIB1, an indication in the SIB1 indicates that the cell only provides access to NPNs, and only one PLMN-ID is included in the information element "PLMN-IdentityInfoList" in the SIB1 and the PLMN-ID is a value associated with indicating NPN support.

In determination block 506, the apparatus (such as a processing system) may perform operations to determine whether an NPN-ID in the received SIB1 matches an NPN-ID in a stored SIB in response to determining that the cell supports NPNs based on the received SIB1. In some aspects, the apparatus (such as a processing system) may perform operations to determine whether an NPN-ID in the received SIB1 matches an NPN-ID in a stored SIB in response to determining that the cell supports only NPNs based on the received SIB1. In some aspects, the NPN-ID may be a standalone NPN (SNPN)-identifier (SNPN-ID). In some aspects, the SNPN-ID may include a network identifier (NID) and optionally a public land mobile network (PLMN)-identifier (PLMN-ID). In some aspects, the NPN-ID is a combination of a public land mobile network (PLMN)-identifier (PLMN-ID) and a closed access group (CAG)-identifier (CAG-ID). In some aspects, only a first NPN-ID in the received SIB and only a first NPN-ID associated with the stored SIB are used to determine whether the NPN-ID in the received SIB1 matches the NPN-ID associated with the stored SIB.

In response to determining that the NPN-ID in the received SIB1 and the NPN-ID associated with the stored SIB do not match (i.e., determination block 506=No (or No match)), the apparatus (such as a processing system) may perform operations including validating the stored SIB based at least in part on the received SIB1 in block 512 indicating that the stored SIB is invalid in block 508, and as a result, the apparatus (such as a processing system) will obtain a new SIB according to standard protocol procedures in block 510.

In response to determining that the NPN-ID in the received SIB1 and the NPN-ID associated with the stored SIB do match (i.e., determination block 506=Yes (or Yes match)), the apparatus (such as a processing system) may perform operations including validating the stored SIB based at least in part on the received SIB1 in block 512.

Figure 6:
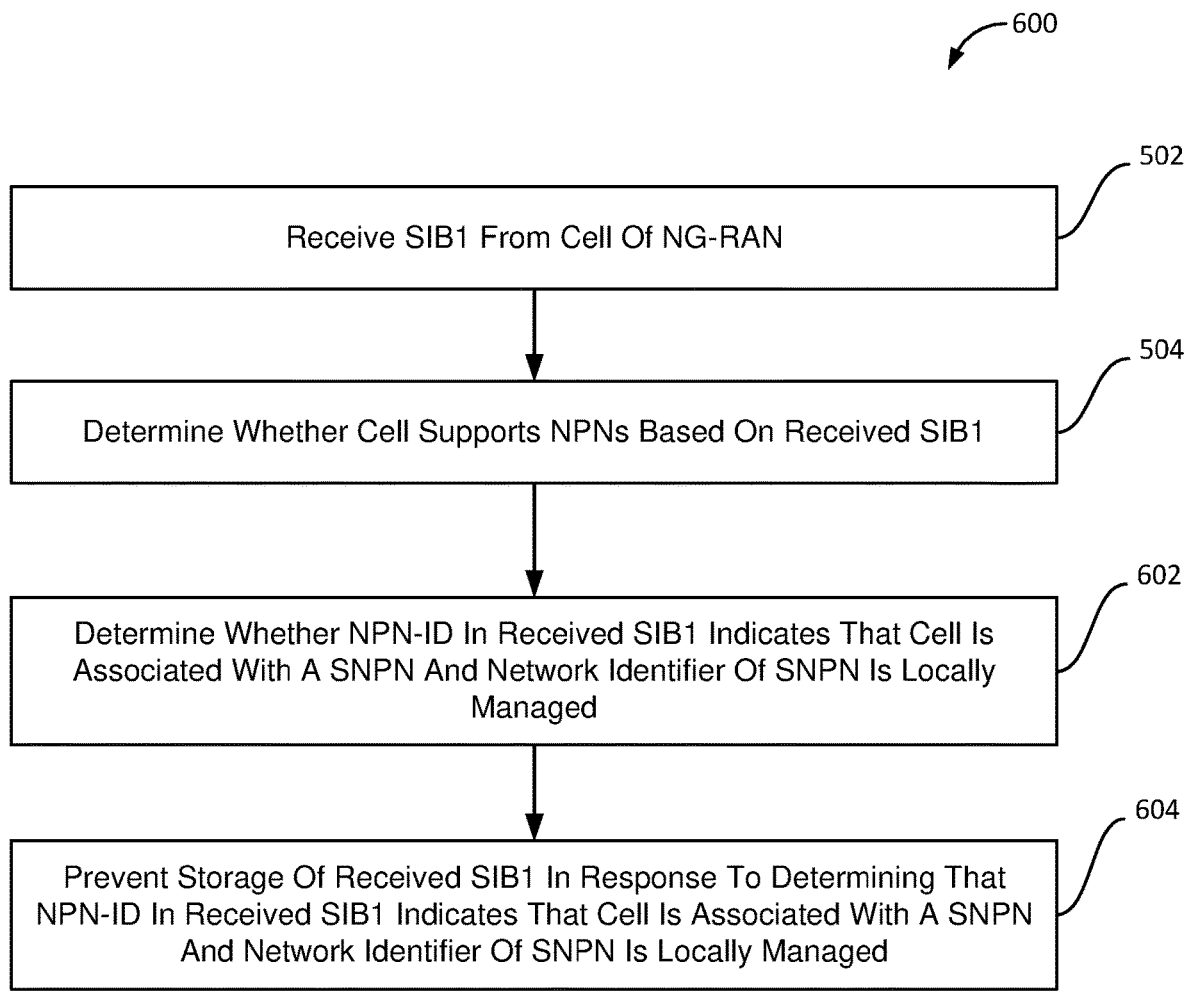
FIG. 6 shows a process flow diagram for an example method for implementing operations in an NG-RAN by an apparatus of a UE.

FIG. 6 shows a process flow diagram for an example method for implementing operations in an NG-RAN by an apparatus (such as a processing system) of a UE. With reference to FIGS. 1-6, the method 600 may be implemented by an apparatus (such as a processing system) (such as 212, 216, 252 or 260) of a UE (such as the wireless device 120, 120a-120e, 200). The operations of method 600 may be performed in conjunction with the operations of method 500 or method 700.

In block 502, the apparatus (such as a processing system) may perform operations including receiving a SIB1 from a cell of the next generation radio access network as described for the like number block of the method 500 (FIG. 5). In some aspects, the SIB1 may be received on a downlink-shared channel (DL-SCH). In some aspects, the cell may be a serving cell.

In block 504, the apparatus (such as a processing system) may perform operations including determining whether the cell supports NPNs based on the received SIB1 as described for the like number block of the method 500 (FIG. 5). In some aspects, determining whether the cell supports NPNs based on the received SIB1 may include determining whether the cell supports only NPNs based on the received SIB1. In some aspects, the received SIB1 may indicate that the cell supports only NPNs by one or more of an information element "cellreservedforotheruse" in the SIB1 set to true and at least one NPN-ID or CAG-ID indicated in the SIB1, an indication in the SIB1 indicates that the cell only provides access to NPNs, and only one PLMN-ID is included in the information element "PLMN-IdentityInfoList" in the SIB1 and the PLMN-ID is a value associated with indicating NPN support.

In block 602, the apparatus (such as a processing system) may perform operations including determining whether an NPN-ID in the received SIB1 indicates that the cell is associated with a SNPN and a network identifier of the SNPN is locally managed. In some aspects, the NPN-ID in the received SIB1 that indicates that the cell is associated with the SNPN may be a first NPN in the received SIB1. In some aspects, the network identifier of the SNPN being locally managed may be indicated at least in part by one or more bits of the network identifier of the SNPN.

In block 604, the apparatus (such as a processing system) may perform operations including preventing storage of the received SIB1 in response to determining that the NPN-ID in the received SIB1 indicates that the cell is associated with a SNPN and a network identifier of the SNPN is locally managed.

Figure 7:
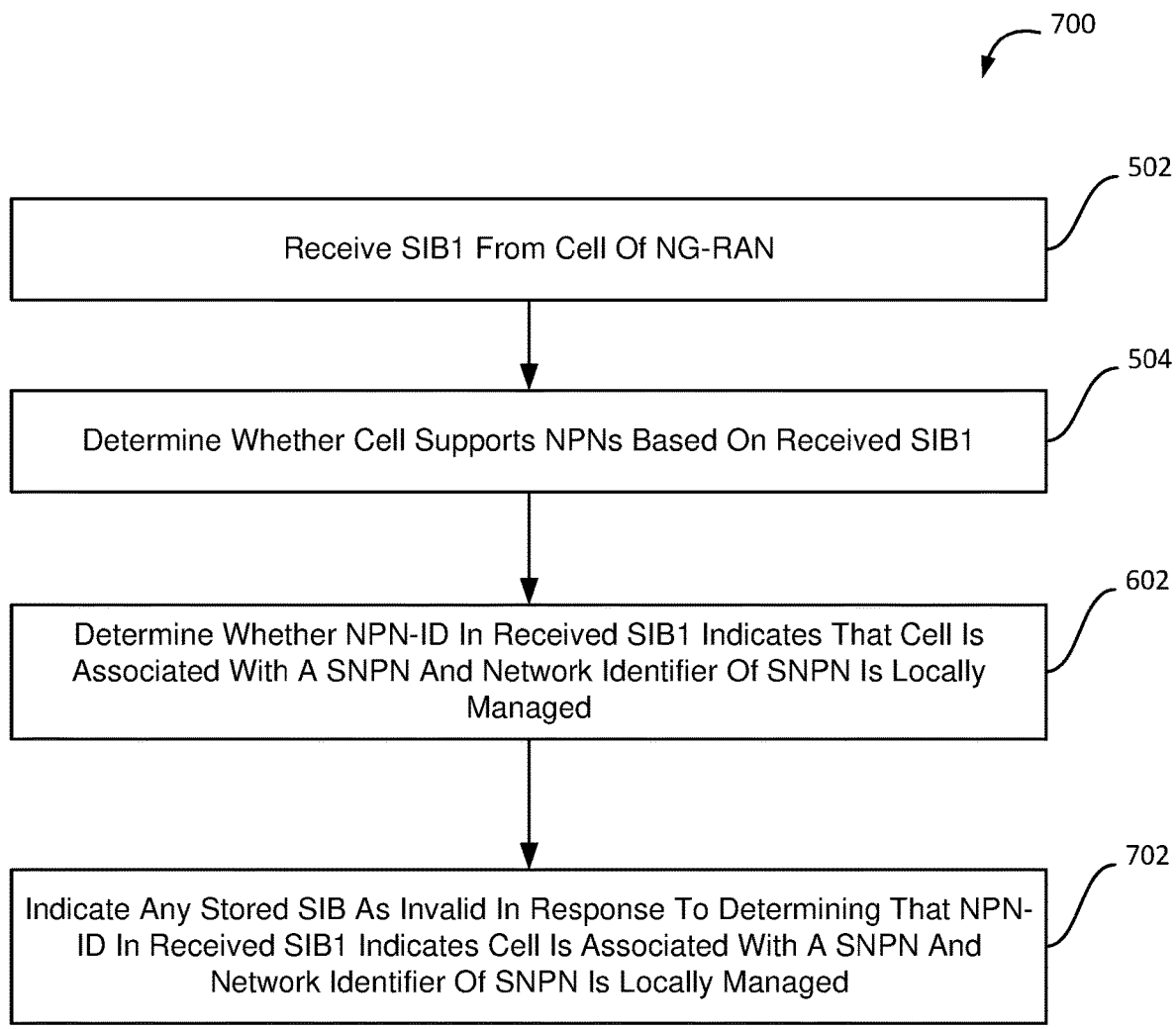
FIG. 7 shows a process flow diagram for an example method for implementing operations in an NG-RAN by an apparatus of a UE.

FIG. 7 shows a process flow diagram for an example method for implementing operations in an NG-RAN by an apparatus (such as a processing system) of a UE. With reference to FIGS. 1-7, the method 700 may be implemented by an apparatus (such as a processing system) (such as 212, 216, 252 or 260) of a UE (such as the wireless device 120, 120a-120e, 200). The operations of method 700 may be performed in conjunction with the operations of the method 500 or the method 600.

In block 502, the apparatus (such as a processing system) may perform operations including receiving a SIB1 from a cell of the next generation radio access network as described for the like number block of the method 500 (FIG. 5). In some aspects, the SIB1 may be received on a downlink-shared channel (DL-SCH). In some aspects, the cell may be a serving cell.

In block 504, the apparatus (such as a processing system) may perform operations including determining whether the cell supports NPNs based on the received SIB1 as described for the like number block of the method 500 (FIG. 5). In some aspects, determining whether the cell supports NPNs based on the received SIB1 may include determining whether the cell supports only NPNs based on the received SIB1. In some aspects, the received SIB1 may indicate that the cell supports only NPNs by one or more of an information element "cellreservedforotheruse" in the SIB1 set to true and at least one NPN-ID or CAG-ID indicated in the SIB1, an indication in the SIB1 indicates that the cell only provides access to NPNs, and only one PLMN-ID is included in the information element "PLMN-IdentityInfo-List" in the SIB1 and the PLMN-ID is a value associated with indicating NPN support.

In block 602, the apparatus (such as a processing system) may perform operations including determining whether an NPN-ID in the received SIB1 indicates that the cell is associated with a SNPN and a network identifier of the SNPN is locally managed as described for the like number block of the method 600 (FIG. 6). In some aspects, the NPN-ID in the received SIB1 that indicates that the cell is associated with the SNPN may be a first NPN in the received SIB1. In some aspects, the network identifier of the SNPN being locally managed may be indicated at least in part by one or more bits of the network identifier of the SNPN.

In block 702, the apparatus (such as a processing system) may perform operations including indicating any stored SIB is invalid in response to determining that the NPN-ID in the received SIB1 indicates that the cell is associated with a SNPN and a network identifier of the SNPN is locally managed.

Figure 8:
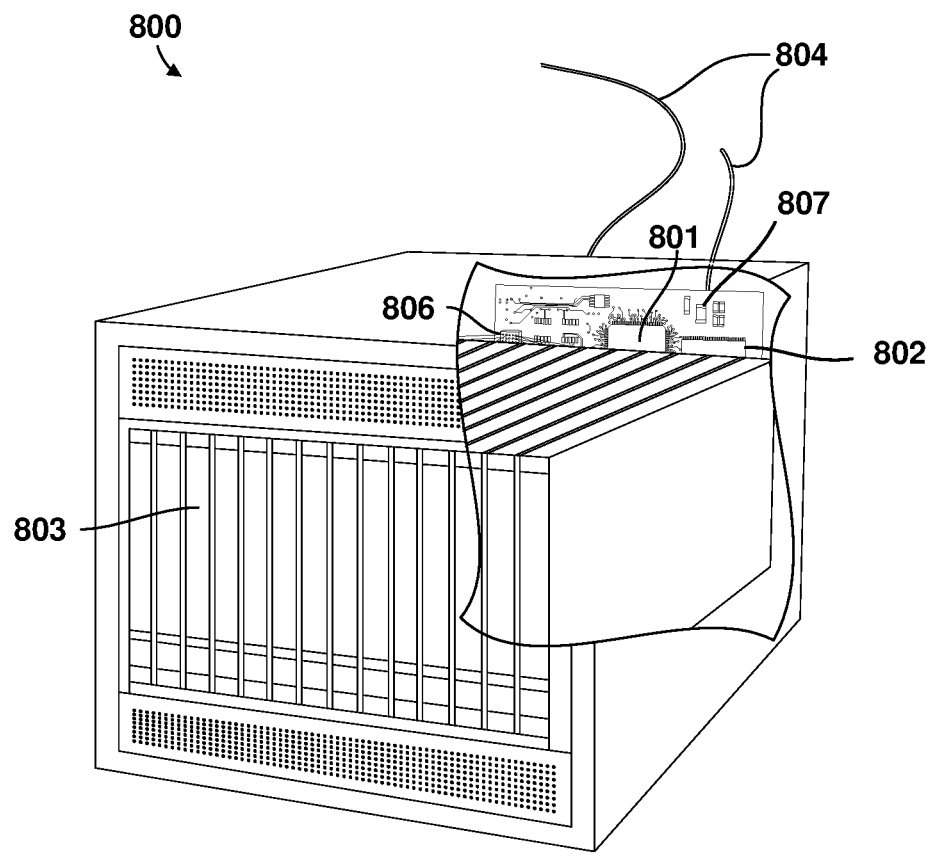
FIG. 8 shows a component block diagram of an example network computing device.

FIG. 8 shows a component block diagram of an example network computing device 800. Some implementations may be implemented on a variety of wireless network devices, an example of which is illustrated in FIG. 8 in the form of a wireless network computing device 800 functioning as a network element of a communication network, such as a base station. Such network computing devices may include at least the components illustrated in FIG. 8. With reference to FIGS. 1-8, the network computing device 800 may typically include an apparatus (such as a processing system) 801 coupled to volatile memory 802 and a large capacity nonvolatile memory, such as a disk drive 803. The network computing device 800 also may include a peripheral memory access device such as a floppy disc drive, compact disc (CD) or digital video disc (DVD) drive 806 coupled to the apparatus (such as a processing system) 801. The network computing device 800 also may include network access ports 804 (or interfaces) coupled to the apparatus (such as a processing system) 801 for establishing data connections with a network, such as the Internet or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
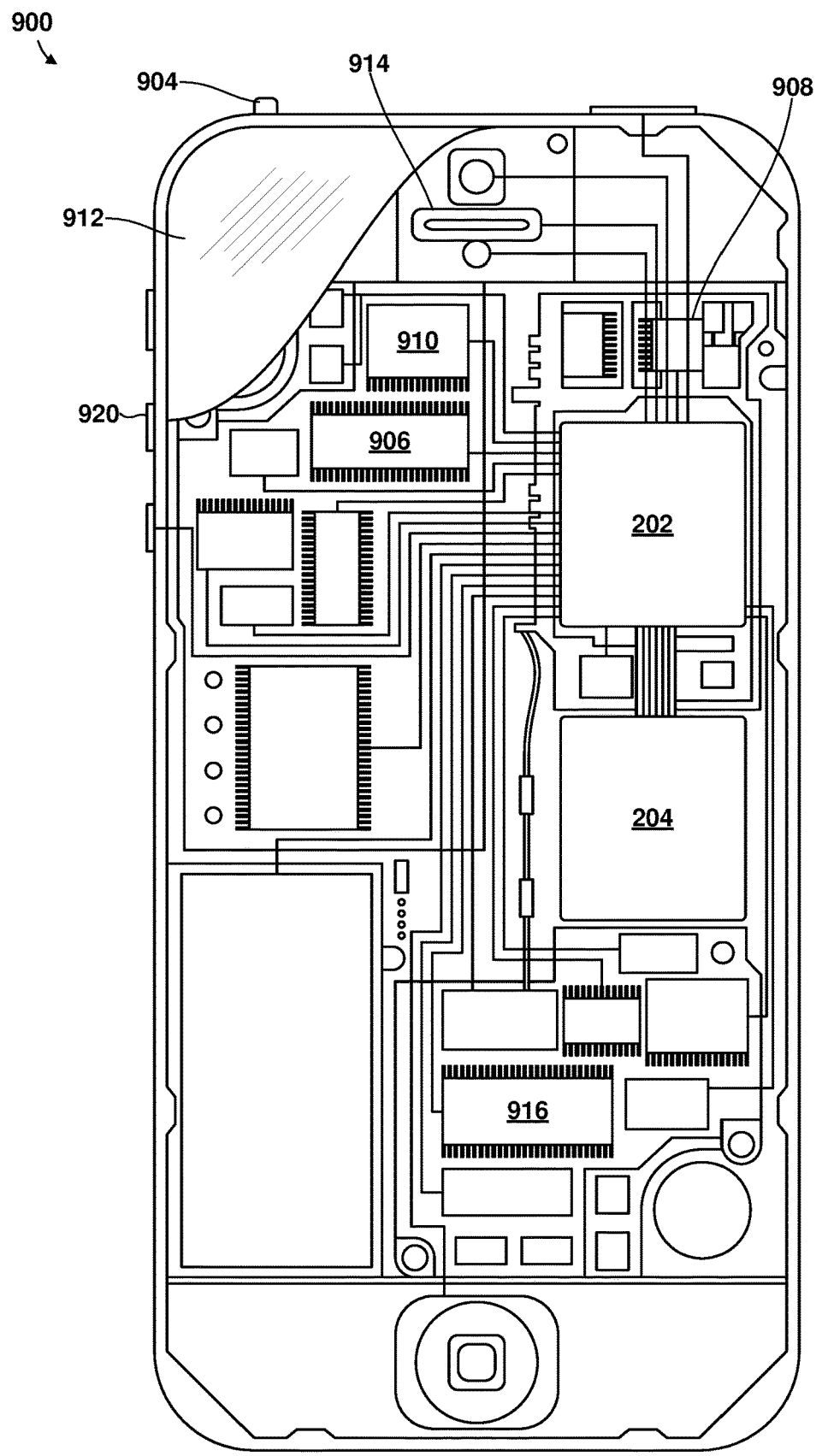
FIG. 9 shows a component block diagram of an example UE.

FIG. 9 shows a component block diagram of an example UE 900. In various implementations, the UE 900 may be similar to the wireless devices 120, 120a-120e, 200 and include an apparatus 402 as shown in FIGS. 1-4. With reference to FIGS. 1-9, the UE 900 may include a first SOC 202 (for example a SOC-CPU) coupled to a second SOC 204 (for example a 5G capable SOC). The first and second SOCs 202, 204 may be coupled to internal memory 906, 916, a display 912, and to a speaker 914. Additionally, the UE 900 may include an antenna 904 for sending and receiving electromagnetic radiation that may be connected to a wireless data link or cellular telephone transceiver 908 coupled to one or more processing systems in the first or second SOCs 202, 204. UE 900 typically also includes menu selection buttons or rocker switches 920 for receiving user inputs.

A UE 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processing systems in the first and second SOCs 202, 204, wireless transceiver 908 and CODEC 910 may include a digital signal processing system (DSP) circuit (not shown separately).

The processing systems of the wireless network 900 and the UE 900 may be any programmable microprocessor, microcomputer or multiple processor chip or chips that can be configured by software instructions (applications) to perform a variety of functions, including the functions of some implementations described below. In some mobile devices, multiple processors may be provided, such as one processor within an SOC 204 dedicated to wireless communication functions and one processor within an SOC 202 dedicated to running other applications. Typically, software applications may be stored in the memory 906, 916 before they are accessed and loaded into the processing system. The processing systems may include internal memory sufficient to store the application software instructions.

Implementation examples are described in the following numbered clauses:

1. A method and an apparatus, a UE, and a non-transitory medium storing instructions implementing the method for wireless communication by a UE in an NG-RAN, including:
   receiving, at the UE, a system information block (SIB) one (SIB1) from a cell of the NG-RAN;

determining, by the UE, whether the cell supports non-public networks (NPNs) based on the received SIB1;

determining, by the UE, whether an NPN-identifier (NPN-ID) in the received SIB1 matches an NPN-ID associated with a stored SIB in response to determining that the cell supports NPNs based on the received SIB1; and validating, by the UE, the stored SIB based at least in part on the received SIB1 in response to determining that the NPN-ID in the received SIB1 and the NPN-ID associated with the stored SIB match.

2. The method, apparatus, UE and non-transitory medium of clause 1, further including:

determining, by the UE, whether the cell supports NPNs based on the received SIB1 includes determining, by the UE, whether the cell supports only NPNs based on the received SIB1; and determining, by the UE, whether a NPN-identifier (NPN-ID) in the received SIB1 matches an NPN-ID associated with a stored SIB in response to determining that the cell supports NPNs based on the received SIB1 includes determining, by the UE, whether an NPN-ID in the received SIB1 matches an NPN-ID associated with a stored SIB in response to determining that the cell supports only NPNs based on the received SIB1.

3. The method, apparatus, UE and non-transitory medium of any of clauses 1 or 2, further including indicating, by the UE, that the stored SIB is invalid in response to determining that the NPN-ID in the received SIB1 and the NPN-ID associated with the stored SIB do not match.

4. The method, apparatus, UE and non-transitory medium of any of clauses 1-3, where the NPN-ID is a standalone NPN (SNPN)-identifier (SNPN-ID).

5. The method, apparatus, UE and non-transitory medium of clauses 4, where the SNPN-ID includes a network identifier (NID) and optionally a public land mobile network (PLMN)-identifier (PLMN-ID).

6. The method, apparatus, UE and non-transitory medium any of clauses 1-3, where the NPN-ID is a combination of a public land mobile network (PLMN)-identifier (PLMN-ID) and a closed access group (CAG)-identifier (CAG-ID).

7. The method, apparatus, UE and non-transitory medium of any of clauses 1-6, where only a first NPN-ID in the received SIB and only a first NPN-ID associated with the stored SIB are used to determine whether the NPN-ID in the received SIB1 matches the NPN-ID associated with the stored SIB.

8. The method, apparatus, UE and non-transitory medium of any of clauses 1-7, further including:

determining, by the UE, whether an NPN-identifier (NPN-ID) in the received SIB1 indicates that the cell is associated with a standalone NPN (SNPN) and a network identifier of the SNPN is locally managed.

9. The method, apparatus, UE and non-transitory medium of clause 8, where the NPN-ID in the received SIB1 that indicates that the cell is associated with the SNPN is a first NPN in the received SIB1.

10. The method, apparatus, UE and non-transitory medium of any of clauses 8 or 9, further including:

preventing, by the UE, storage of the received SIB1 in response to determining that the NPN-ID in the received SIB1 indicates that the cell is associated with a standalone SNPN and a network identifier of the SNPN is locally managed.

11. The method, apparatus, UE and non-transitory medium of any of clauses 8 or 9, further including:

indicating, by the UE, any stored SIB is invalid in response to determining that the NPN-ID in the received SIB1 indicates that the cell is associated with a standalone SNPN and a network identifier of the SNPN is locally managed.

12. The method, apparatus, UE and non-transitory medium of any of clauses 8-11, where the network identifier of the SNPN being locally managed is indicated at least in part by one or more bits of the network identifier of the SNPN.

13. The method, apparatus, UE and non-transitory medium of any of clauses 1-12, where the SIB1 is received on a downlink-shared channel (DL-SCH).

14. The method, apparatus, UE and non-transitory medium of any of clauses 1-13, where the cell is a serving cell.

15. The method, apparatus, UE and non-transitory medium of any of clauses 1-14, where the received SIB1 indicates that the cell supports only NPNs by one or more of:

an information element "cellreservedforotheruse" in the SIB1 set to true and at least one standalone NPN (SNPN)-identifier (SNPN-ID) or a closed access group (CAG)-identifier (CAG-ID) indicated in the SIB1;

an indication in the SIB1 indicates that the cell only provides access to NPNs; and only one PLMN-ID is included in the information element "PLMN-IdentityInfoList" in the SIB1 and the PLMN-ID is a value associated with indicating NPN support.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500, 600, and 700 may be substituted for or combined with one or more operations of the methods 500, 600, and 700.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on an apparatus (such as a processing system), a processing system, an object, an executable, a thread of execution, a program, or a computer. By way of illustration, both an application running on a wireless device and the wireless device may be referred to as a component. One or more components may reside within a process or thread of execution and a component may be localized on one processor or core of a processing system or distributed between two or more processors, cores or processing systems. In addition, these components may execute from various non-transitory computer readable media having various instructions or data structures stored thereon. Components may communicate by way of local or remote processes, function or procedure calls, electronic signals, data packets, memory read/writes, and other known network, computer, processing system, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus (which may include a processing system) used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. The apparatus also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by an apparatus (such as a processing system), which may be coupled to a memory. The memory may be a non-transitory computer-readable storage medium that stores processor-executable instructions. The memory may store an operating system, user application software, or other executable instructions. The memory also may store application data, such as an array data structure. The apparatus (such as a processing system) may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
receiving a system information block (SIB) from a cell, the received SIB including at least one non-public network (NPN) identifier, wherein the received SIB is a system information block one (SIB 1);
determining that the cell is an NPN-only cell based on a cell reservation indication that is set to a value of true in the received SIB and a public land mobile network (PLMN) information element in the received SIB that includes only one PLMN identifier (PLMN-ID) having a value associated with NPN support;
determining whether the at least one NPN identifier in the received SIB indicates that the cell is associated with a standalone NPN (SNPN) and whether a network identifier of the SNPN indicates that the cell is locally managed; and
validating a stored SIB based on the cell being an NPN-only cell, the network identifier of the SNPN indicating that the cell is not locally managed, and the at least one NPN identifier of the received SIB being a match with a stored NPN identifier associated with the stored SIB.

2. The method of claim 1, wherein the stored SIB is of a different type than a type of the received SIB.

3. The method of claim 1, wherein the cell reservation indication comprises a "cellreservedforotheruse" information element, in the received SIB, having the value set to true.

4. The method of claim 1 further comprising:
matching the received NPN identifier with the stored NPN identifier associated with the stored SIB.

5. The method of claim 1, wherein the received NPN identifier is a first NPN identifier from the received SIB.

6. The method of claim 1, wherein the value associated with NPN support comprises a specific Third Generation Partnership Project (3GPP) value.

7. An apparatus of a user equipment (UE), comprising:
a transceiver configured to cause the UE to receive a system information block (SIB) from a cell, the received SIB including at least one non-public network (NPN) identifier, wherein the received SIB is a system information block one (SIB 1); and
a processing system that includes one or more processors coupled with one or more memory elements, the processing system configured to cause the UE to:
determine that the cell is an NPN-only cell based on a cell reservation indication that is set to a value of true in the received SIB and a public land mobile network (PLMN) information element in the received SIB that includes only one PLMN identifier (PLMN-ID) having a value associated with NPN support;
determine whether the at least one NPN identifier in the received SIB indicates that the cell is associated with a standalone NPN (SNPN) and whether a network identifier of the SNPN indicates that the cell is locally managed; and
validate a stored SIB based on the cell being an NPN-only cell, the network identifier of the SNPN indicating that the cell is not locally managed, and the at least one NPN identifier of the received SIB being a match with a stored NPN identifier associated with the stored SIB.

8. The apparatus of claim 7, wherein the stored SIB is of a different type than a type of the received SIB.

9. The apparatus of claim 7, wherein the cell reservation indication comprises a "cellreservedforotheruse" information element, in the received SIB, having the value set to true.

10. The apparatus of claim 7, wherein the processing system is configured to cause the UE to:
match the received NPN identifier with the stored NPN identifier associated with the stored SIB.

11. The apparatus of claim 7, wherein the received NPN identifier is a first NPN identifier from the received SIB.

12. The apparatus of claim 7, wherein the value associated with NPN support comprises a specific Third Generation Partnership Project (3GPP) value.

13. An apparatus of wireless communication, comprising:
means for receiving a system information block (SIB) from a cell, the received SIB including at least one NPN identifier, wherein the received SIB is a system information block one (SIB 1);
means for determining that the cell is an NPN-only cell based on a cell reservation indication that is set to a value of true in the received SIB and a public land mobile network (PLMN) information element in the received SIB that includes only one PLMN identifier (PLMN-ID) having a value associated with NPN support;
means for determining whether the at least one NPN identifier in the received SIB indicates that the cell is associated with a standalone NPN (SNPN) and whether a network identifier of the SNPN indicates that the cell is locally managed; and
means for validating a stored SIB based on the cell being an NPN-only cell, the network identifier of the SNPN indicating that the cell is not locally managed, and the at least one NPN identifier of the received SIB being a match with a stored NPN identifier associated with the stored SIB.

14. The apparatus of claim 13, wherein the cell reservation indication comprises a "cellreservedforotheruse" information element, in the received SIB, having the value set to true.

15. The apparatus of claim 13, further comprising:
means for matching the received NPN identifier with the stored NPN identifier associated with the stored SIB.

16. The apparatus of claim 13, wherein the received NPN identifier is a first NPN identifier from the received SIB.

17. The apparatus of claim 13, wherein the value associated with NPN support comprises a specific Third Generation Partnership Project (3GPP) value.

18. One or more non-transitory computer-readable media having instructions stored thereon, the instructions that, when executed by one or more processors of a user equipment (UE), cause the UE to perform operations comprising:

receiving a system information block (SIB) from a cell, the received SIB including at least one non-public network (NPN) identifier, wherein the received SIB is a system information block one (SIB 1);

determining that the cell is an NPN-only cell based on a cell reservation indication that is set to a value of true in the received SIB and a public land mobile network (PLMN) information element in the received SIB that includes only one PLMN identifier (PLMN-ID) having a value associated with NPN support;

determining whether the at least one NPN identifier in the received SIB indicates that the cell is associated with a standalone NPN (SNPN) and whether a network identifier of the SNPN indicates that the cell is locally managed; and validating a stored SIB based on the cell being an NPN-only cell, the network identifier of the SNPN indicating that the cell is not locally managed, and the at least one NPN identifier of the received SIB being a match with a stored NPN identifier associated with the stored SIB.

19. The one or more non-transitory computer-readable media of claim 18, wherein the cell reservation indication comprises a "cellreservedforotheruse" information element, in the received SIB, having the value set to true.

20. The one or more non-transitory computer-readable media of claim 18, wherein the instructions that, when executed by the one or more processors, cause the UE to perform operations comprising:

matching the received NPN identifier with the stored NPN identifier associated with the stored SIB.

21. The one or more non-transitory computer-readable media of claim 18, wherein the value associated with NPN support comprises a specific Third Generation Partnership Project (3GPP) value.

\* \* \* \* \*